May 31, 1955          P. HEIN          2,709,357
COMBINATION LOCK MECHANISM
Filed May 3, 1951          3 Sheets-Sheet 1
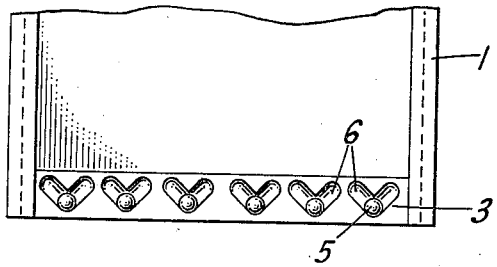
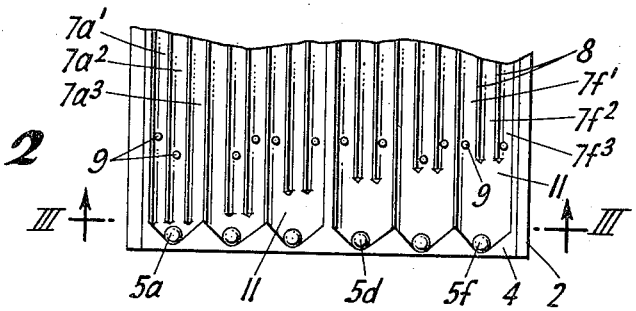
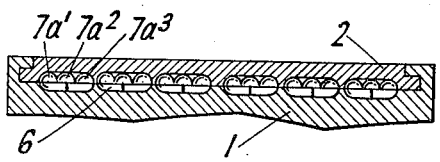
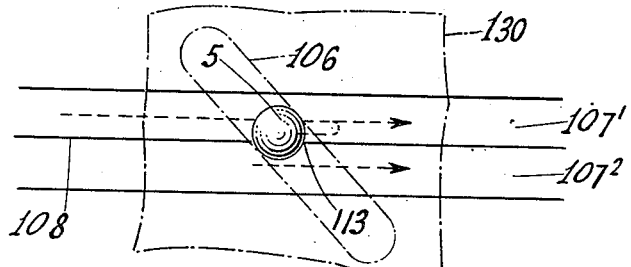
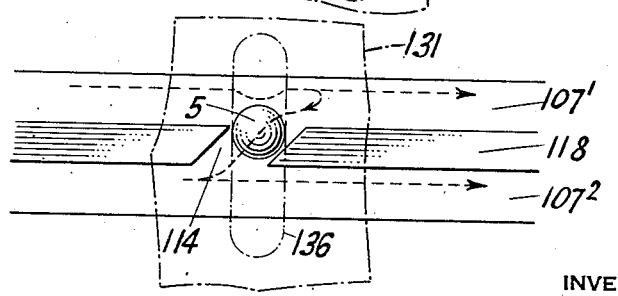
INVENTOR
PIET HEIN
BY
ATTORNEY May 31, 1955 P. HEIN 2,709,357
COMBINATION LOCK MECHANISM
Filed May 3, 1951 3 Sheets-Sheet 2
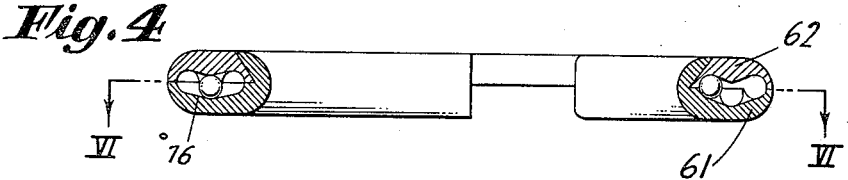
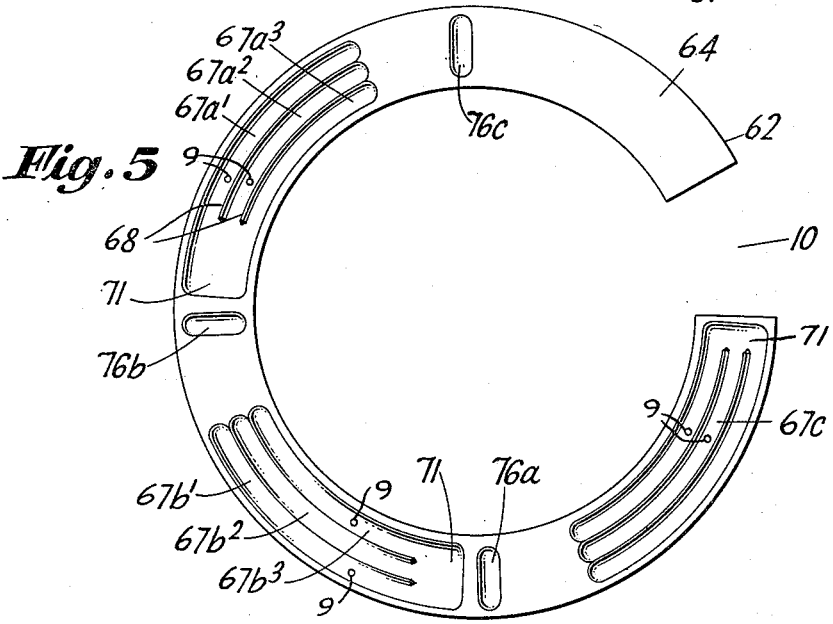
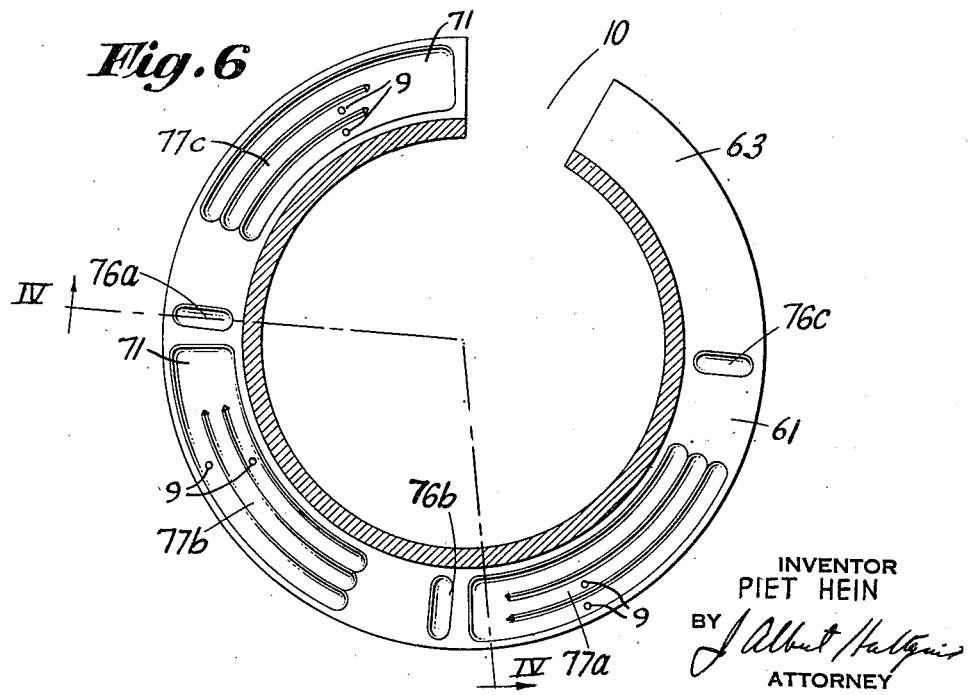
INVENTOR
PIET HEIN
BY
ATTORNEY May 31, 1955  P. HEIN  2,709,357
COMBINATION LOCK MECHANISM
Filed May 3, 1951  3 Sheets-Sheet 3

INVENTOR
PIET HEIN
BY
ATTORNEY

United States Patent Office 2,709,357
Patented May 31, 1955

2,709,357

COMBINATION LOCK MECHANISM

Piet Hein, New York, N. Y.

Application May 3, 1951, Serial No. 224,420

3 Claims. (Cl. 70—290)

This invention relates to a lock mechanism for curtailing and releasing the mutual movability of two bodies whose surfaces engage each other in a sliding motion, principally characterized by a lock implement partly located in grooves in both surfaces in such a way that its freedom of movement in the border areas between the bodies is limited, at any given moment, to the area where the grooves overlap. By appropriate embodiment and limitation of the grooves in the individual surfaces in such a way, for instance, that the lock implement is allowed only one degree of freedom in its motion relative to each surface, the mechanism may be so fashioned as to permit the two bodies to engage each other in motion only within certain definite limits, for instance, by causing the degree of freedom of the locking implement relative to one or both bodies to be deprived, at a desired stage, of a component in the direction of the inter-engaged motion of the two bodies, or by curtailing the degree of freedom by a suitable blocking device.

The circumstance that the locking implement remains partly embedded in grooves in the two sliding surfaces results in the lock mechanism needing no extra space and achieving very considerable strength within small dimensions.

According to the invention one surface, at least, is provided with several grooves to accommodate the locking implement, and of said grooves at least one (but never all) is so fashioned or circumscribed that the free movement of the locking implement becomes insufficient to permit the interaction of the bodies beyond a given border position. So, in this embodiment a choice must be made, as the locking implement has to be directed into a particular groove within a system of coordinated grooves in order to permit the bodies to move on beyond said border position. This circumstance can be exploited by incorporating the lock mechanism into a lock that may be opened, it is true, by an uninitiated person through gradual probing of the various manipulations possible, but which can nevertheless serve very satisfactorily as a lock on doors, drawers, wardrobes, boxes, etc. where the principal purpose is to safeguard the object in question against undesired opening, rather than to prevent unauthorized opening. According to the invention a practical embodiment of such a lock mechanism is provided with a system of coordinated, parallel grooves in one of the surfaces—preferably parallel to the direction of the motion in which the surfaces engage each other. So fashioned, the lock system occupies a minimum of space.

In such a lock mechanism where one surface is provided with a system of coordinated grooves, the other surface—according to the invention—may be provided with a portion of a groove through which the locking implement can be moved by the interacting motion of the two bodies in a direction divergent from the normal one, whereby a certain groove is selected in the first surface into which the locking implement will slide by subsequent motion of the bodies in their normal direction.

The choice can also be effected by two or more grooves in the first-mentioned surface issuing from a chamber in which the locking implement, steered from the outside, can be moved and brought into position, immediately facing the desired groove, either by gravitation, spring power, or by some mechanical, magnetic or electrical influence.

According to the invention the simplest way to achieve this result is to have the locking implement freely movable in said chamber and brought into position opposite the desired groove by slanting the chamber in various directions or at different angles, or both combined.

For this purpose the chamber, according to the invention may have a V-shaped or a polygonal surface fitted with several breaks, in which the breaks and endpoints form natural resting places for the freely movable locking implement, as a groove would issue from the chamber opposite each resting place.

Another choice, according to the invention, could be based on the fact that the passage of a freely moving agent from a groove into a branch-groove adjoining it could, in certain circumstances, depend upon the direction in which it passes the outlet of the branch-groove causing the locking implement, for instance, to remain in the one groove by one-way motion in a certain direction, whereas it will slip into the branch-groove if a retrograde motion is effected after it has passed the outlet of the branch-groove.

To bring about this effect there issues, according to the invention, from a groove in one surface a branch-groove whose outlet, in conjunction with the corresponding branch-groove in the other surface, is so arranged that the passage area of the branch-groove into, and immediately inside, the outlet facing the position in which the locking implement first is brought opposite to the outlet of the branch-groove, constantly decreases due to the passage of the branch-groove of the other surface in one direction, whereas by passage in the opposite direction it constantly increases until the locking implement slips through.

Thus the choice one makes is governed by whether, in one or more given positions, one continues the interacting motion of the surfaces undisturbed, or reverses it for awhile before resuming the regular motion.

Said branch-groove may issue mainly at a right angle from the groove in the first surface and may also consist of a simple opening in the wall of the former, in which case the branch-groove in the other surface would slant in relation to the groove in the first surface as far as that portion is concerned which interacts with said groove near the outlet of the branch-groove.

However, the branch-groove may also run obliquely into the groove of the first surface in which case the interacting branch-groove in the second surface can be mainly at right angles with the groove of the first.

Lock systems like those in question may have their grooves placed in plane or cylindrical—including prismatic—surfaces that are obliged to move in a straight line relatively to each other, eventually with a possibility of manipulating the motion transversely. This could apply, for instance, to sliding bolts, sliding doors, sliding lids and similar objects where two bodies engage each other in a straight-line motion. The grooves may also be placed in plane surfaces or in surfaces like turntables constrained to execute a revolving motion in relation to each other. This is practical, for instance, in door locks, revolving knobs or handles, bicycle locks and key rings as well as in other mainly ring-shaped objects that can be opened.

In particular, the grooves may be located on cylindrical revolving surfaces bound to engage each other in a revolving movement around a common axis, eventually combined with axial motion. Such a lock mechanism could be used as a pressure mechanism or actuator in a bolt lock.

It is also possible to use lock mechanisms like the above mentioned in such a manner that the intended function results in a rigid coupling of the two bodies instead of releasing them; for instance, by one movable body taking the other along in the motion after the lock mechanism has been led into a groove of limited effective area.

As indicated, the above described lock mechanisms can be provided with a single system of grooves and with one appurtenant locking implement. Alternatively, in an important modification of the invention there are provided in an interponent member between the two bodies several systems of grooves with appurtenant locking implements. This makes the locking mechanism a regular combination lock the use of which depends upon employing the right combination for selecting grooves in all of the systems.

Due to its extremely compact and robust construction the present lock mechanism is excellently fitted for exploitation in the manufacture of small combination locks that still offer a very great number of combinations; moreover, this lock mechanism has an absolute minimum of movable parts.

According to the invention, the choice of grooves in each of the individual systems, or in smaller groups of them, lies within diverse areas where the bodies engage each other in motion, with the result that the manipulations required to effect the choice in the individual systems are not mutually impeding. To facilitate the manipulation a practical key device, according to the invention, comes with it for visual, audible or tactile marking of the interrelated positions of the bodies where the choice is to be made, for instance, a scale (or dial) on one body operating in conjunction with a scale, or dial, a window, or a marker, on the other body with a pawl mechanism or a spring-lock marking certain resting positions, or a ratchet mechanism that releases an audible signal in each selector position.

To retard the successive selection in the various systems from making possible a gradual deciphering (breaking) of the key, the invention prescribes that care be taken for the border position limiting the interacting motion-possibility from the starting point in case of wrong manipulation, be identical no matter into which system a locking implement is introduced in a groove of limited effective area.

According to the invention, limiting of the effective area of the grooves is appropriately brought about by placing at intervals in the grooves pegs or similar obstructions, a procedure which, from a manufacturing point of view, presents the advantage that the principal parts of the locking mechanism can be manufactured in mass production, thus making possible a cheap and rational production and at the same time securing maximum exactness.

The obstructions may be effected, for instance, by using a removable block or chock to be placed across the grooves of an individual system and forming the terminal limit to some of them while with other grooves extending to a spot facing at least one of the other systems. If all, or groups of, these movable blocks or chocks are manufactured so as to be of uniform external dimensions, but with varying groove arrangements, the different combinations can be brought about by inserting such blocks or chocks with varying groove arrangements opposite the different groove systems in recesses or similar seats appropriate for the purpose placed especially in the main part of the lock mechanism.

Said extended grooves in these movable and interchangeable blocks or chocks may, in a practical embodiment, be brought—independently of the system of coordinated grooves—to a branch groove apart, possibly located in the other surface, and which will permit continued interacting motion of the two bodies. This permits a relatively wide movement of the two bodies beyond the border position that corresponds to a wrong manipulation, without said blocks or chocks needing to be of any considerable size.

According to the invention the bodies may engage each other in a sliding motion with several sets of coordinated surfaces, in which case there will be at least one system of grooves, preferably more, with its own locking implement in several of these sets of surfaces, eventually in all of them. This makes it possible to place so many systems within an extremely limited space that the number of resulting combinations represent an ample guarantee against any deciphering of the key by gradual probing and experimenting.

The invention also includes special embodiments of locks executed with lock mechanisms according to the above described principles.

Such a lock can be characterized by the mutually movable bodies being steered for a revolving motion and forming, in their initial position, a closed ring, or circumscribe a closed recess in whose periphery an opening can be effected only through interacting motion beyond a definite border position dependent upon the lock mechanism, said border position corresponding to one or more locking organs having been introduced in grooves of limited effective area.

In another lock, especially adapted for use as a combination lock on doors of safes or strong boxes, for instance, and in which the interacting bodies consist of two, or preferably more plane disks of which one or the other group is secured to the door while the other, or the other group, may be revolving, a number of groove systems are placed in one or both of the bodies concentrically about the revolving axis, each extending over an angle that closely approaches 180°.

The invention, moreover, includes the use of lock mechanisms like those described as an element in puzzles and games of dexterity based, for instance, on finding out by probing and experimenting a series of wholly or partly unrevealed manipulations and further based on the fact that in order to execute a revealed series of manipulations special difficulties or obstructions must be overcome, such as losing prior positions which the manipulator had already attained, if he fails to execute subsequent movements in a certain way, etc.

The invention is shown in the drawing as follows:

Figure 1 is a partly schematical top view of a box with a combination lock according to the invention.

Figure 2 is a top view of an appurtenant sliding lid, here imagined transparent.

Figure 3 is a section following the line III—III in Figure 2 with the lid pushed in place on the box.

Figure 4 is a cross-section of a ring lock according to the invention.

Figures 5 and 6 are a top view of the two component parts, the top (Figure 5) being imagined transparent, and Figure 6 a sectional view following the line VI—VI in Figure 4.

Figures 7 and 8 are enlarged diagrams illustrating choice of grooves at embranchments.

Figure 9:
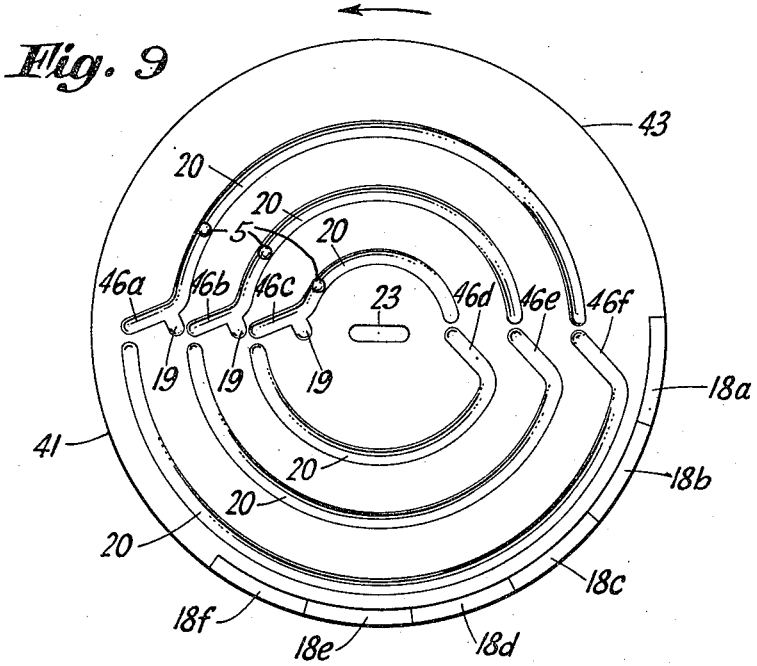
Figures 9 and 10 are interacting surfaces of the main parts of a disk-shaped combination lock according to the invention.

In the embodiment presented in Figures 1–3, body 1 consists of an oblong, rectangular box while body 2 consists of its appurtenant sliding lid. In the surface 3, which is the top edge of the end wall of the box over which the lid is to be pulled out, a number of V-shaped grooves 6 (six, in this example) are fashioned, their cross sections semi-circular and each holding a ball 5 which fits exactly and is yet easily movable in the appurtenant groove. In surface 4—the underside of the lid—six systems of grooves 7 are embodied, each comprising three parallel grooves interconnected as at 11 and being semi-circular in cross-section, fitting the appurtenant ball 5 exactly, yet so that it is easily movable.

A little way inside all of the grooves 7 there are holes or similar devices in which pegs 9 can be plugged in such positions that the distance from each peg 9, to that part of the groove wall 6, that is located off the groove in question, is exactly the same everywhere. As indicated in Figure 2, within each system of three grooves, pegs 9 are placed in two of htem so that pulling out the lid beyond the border position determined by interaction between the pegs 9, the ball 5 and the groove wall 6 will be possible only if the ball in all three systems can be made to take three different stable positions, viz. 1 at the bottom of the V-shaped groove 6 or in its left or right end depending upon whether the box is slanted with the bottom of the V lowest or with one of the V's branches lowest. It will be seen from Figure 2 that partitions 8 of the different systems, end at varying distances from the selection chamber's V-shaped end wall which permits successive selection in one system after the other in the following way.

Remembering that Figure 2 represents a top view of the underside of the lid so that the system $7a^1$, $7a^2$ etc. is farthest to the left with the lid on, the primary selection is made in this system by slanting the box to the right just enough for the ball to be brought to a point just off groove $7a^3$, farthest to the right, in which there is no peg. Thereupon the lid is pulled out to such a point that the ball 5a enters the groove $7a^3$ and is prevented from leaving it. Next the box is slanted to the left to a point where the ball in the next system enters the pegless groove in this system, whereupon the lid is pulled out still a little further and thus the selection proceeds gradually until all of the balls have been brought into the right groove according to the given key. Finally the lid can be pulled out completely.

In the case here described the key is r-l-d-l-d indicating a right slant r, a left slant l, and a downward slant d toward the bottom of the V. It will be seen that the number of combinations are $3^6$—729 (minus 1, viz. the d-d-d-d-d-d-combination). It is impossible to experiment one's way to the correct position in each individual system because all the balls that are in the blocked grooves will run up against the appurtenant pegs 9 at the same time, which means that the position in which the lid is stopped by a wrong manipulation does not depend upon the point at which a ball is introduced into a blocked groove.

In the embodiment shown in Figures 4–6 the body consists of a ring 61 with a gap 10, of about 30° in the circumference while the body 62, consists of a ring on top of which in conjunction with the body 61, forms an approximately toroidal unit in the periphery of which an opening may be formed by such interrelated turning of the bodies 61 and 62 that their respective recesses coincide. Body 62 is secured to body 61 in any convenient manner which will permit relative rotation about the common axis of the bodies. For instance, one body may have an annular dovetail with which the other mates. In the sliding surface between the bodies are placed altogether six systems each consisting of three coordinated grooves running concentrically with the ring's axis and functioning together with radially placed short grooves in the opposite surface. In the concentric grooves 67 and 77 are placed obstructions 9 in a manner corresponding to that described in connection with grooves 7 of Figures 1–3, and the gradual selection takes place in a corresponding manner by slanting the lock unit in different directions. However, the V-shape that determines the positions of the locking implements during the selection is here brought about in the bottom of chambers 76. This is done to show an alternate construction possibility that is equally applicable to embodiments similar to the one shown in Figures 1–3. In the example shown here it is possible, as a matter of fact, to effect selection in two systems at a time, thus, for instance, simultaneously in systems 67a and 67b since every imaginable combination of placing the balls in the chambers 76 of these systems can be brought about by slanting in appropriate directions around lines cutting through the center of the rings. The number of combinations are not thereby decreased since each combination requires a separate slanting direction determined by two variables, viz. the direction of the axis of inclination passing through the center and the direction of rotation about same. This lock, therefore, requires only three successive manipulations for the same number of combination possibilities as the one described above. Moreover, the space in the border surface between the bodies is doubly exploited since various systems of uncoordinated grooves can overlap without detriment, as shown in the drawing.

In the embodiments shown and described the displacement of balls is supposed to be brought about by gravity that keeps them in a certain position relative to the one body, while the selection is taking place.

The principle of groove selection shown in Figures 7 and 8 excels on account of very special constructive simplicity. $107^1$ and $107^2$ indicate two grooves between which the choice has to be made, the balls 5 being supposed to be initially located in the top groove $107^1$ from which it is being moved by the appurtenant groove 106 in an overlying body 130 here shown in phantom in the direction pointed by the arrow.

In the embodiment shown in Figure 7 there is in the partition 108 between the grooves an aperture 113 through which the ball can only just pass, but it is evident from the figure that the inclination of the groove 106, in the overlying body 130 will prevent the ball from slipping through the aperture 113 in passing from left to right, since inclination of the groove causes the edges of the groove to cam the ball through the aperture when moving in one direction but tend to hold it away from the aperture in moving the other way. The selection subsequently takes place in this way that one either moves the body 130 carrying groove 106 and the ball too in a one-way direction from left to right in the top groove where the ball will remain, or, having passed the aperture in this movement brings the groove 106 and consequently also the ball a little way back, thereby causing the ball to fall through, whereupon the motion is continued in the original direction with the ball in the lower groove.

Exactly the same happens in the case of the embodiment represented in Figure 8 in which, though, instead of a simple aperture in the partition 118 a veritable passage 114 has been made, oblique in relation to provide $107^1$ and $107^2$. Groove 136 carried by overlying body 131 in this case lies transverse to the direction of grooves $107^1$ and $107^2$. In Figure 8 the direction of the movement of body 131 and ball 5 likewise goes from left to right and the switch of the ball 5 from one passage to the second takes place by a retrograde movement from right to left when the outlet of the passage 114 has been passed.

Figure 10:
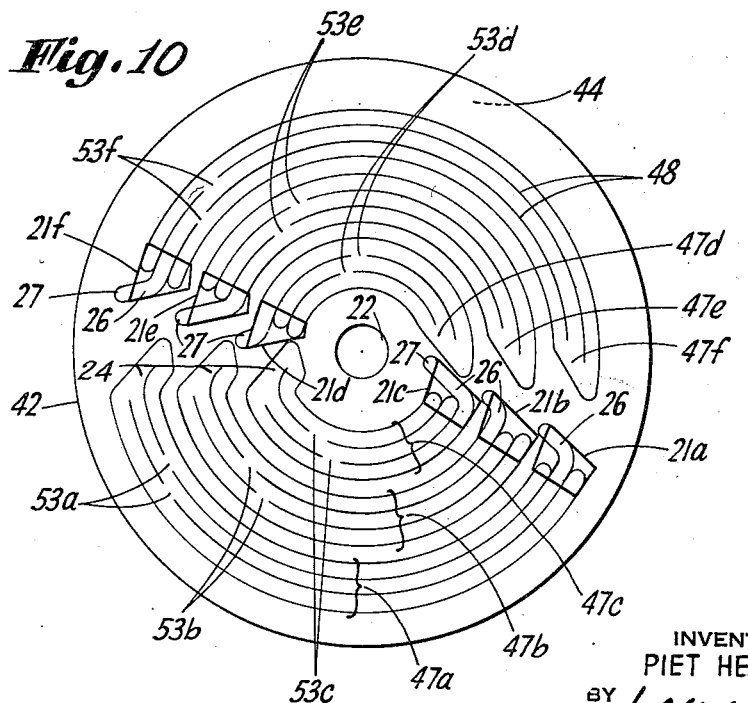

Figures 9 and 10 illustrate the application of this principle of selection in a disk-shaped combination lock in which bodies 41 and 42 are plane disks of which one, body 42 is supposed to be stationary and provided with a central hole 22 wherein the shaft of the lock in question can turn freely while the other body 41 is a rotor that meshes with a non-circular hole 23, and rotates with it.

Figure 10 shows the arrangement of grooves in the surface 44 of the stator while Figure 9 shows the arrangement of grooves in the surface 43, of the rotor engaged with, viewed from the same side—the rotor disk being imagined transparent. In the starting position the stator and the rotor are placed concentric coinciding and, in the main, horizontal.

In the embodiment shown here the stator is provided with altogether six groove systems each comprising three parallel grooves (47a–47f) in the shared partitions of which, 48, there are passage apertures 53a–53f, each located at its individual angular distance from the starting point and in such a way that the passage aperture between the uppermost and the next to uppermost groove in each system is located before or just facing the passage aperture between the next to uppermost and the lowest groove in the same system when the rotor turns in the direction indicated by an arrow in Figure 9.

The groove systems are distributed, as shown, concentrically, three on the lower half and three on the upper half of stator, and all extend over nearly 180°. Each is terminated by its individual exchangeable block or chock 21 inserted and secured, in a manner not shown, in a corresponding recess on the stator. The external contour of the three blocks 21a, 21b, 21c are identical, which renders these three blocks interchangeable, if desired. The same is true of the three other blocks 21d–f, but there is nothing to prevent all six blocks, or any bigger or smaller number, from being interchangeable. In that case each block comprises a terminal limit to two of the grooves in the system to which it belongs and a passage groove 26 for the third groove leading to a resting position 27, which in the example shown here, is located next to the imagined extension of the appurtenant groove system.

As examples are shown three different groove arrangements in each of the two block embodiments, namely with a passage groove corresponding to respectively the innermost, the central and the outermost of the appurtenant groove systems; there is nothing to prevent, however, that the groove arrangement in one or more of the blocks can be identical while other groove arrangements are in abeyance.

The groove systems 47a–47f start at the opposite end from an inclined groove portion 24 in each system, which groove portion leads to an exit position 27, in or next to the imagined extension of the groove systems.

The arrangement of grooves in the rotor surface 43 principally comprises short groove portions 46a–46f slanted in relation to the radius functioning in concert each with its corresponding unit of stator groove systems 47a–47f, for selection of grooves according to the principle illustrated in Figure 7. It will be seen that if the ball 5 continues to move in the direction indicated by the arrow it will pass over the adjacent passage aperture 53a and remain in the top groove of system 47a, whereas in retrograde motion after the first passage of the said aperture 53a it will be led through the latter down to the center groove of system 47a. Thereupon a similar selection between the ball's remaining in groove of system 47a or its transfer to the lowest groove of system 47a may be repeated at the passage aperture 53a.

When the rotor has passed the angle area within which the selection in system 46a, 47a takes place, it enters an angle area wherein selection in the next system 46b, 47b takes place in a like manner at that system's passage aperture 53b and so on, the last selection taking place in the outermost system 46f, 47f through its passage apertures 53f.

If now the right selection has been made in all of the six systems all the balls will have been brought into the appurtenant system groove facing the passage groove 26 in the block 21, which, consequently, will permit the rotor to go on revolving whereby the balls are steered into the resting positions 27. The relatively limited turning thus achieved by the rotor beyond the border position in which it would have been stopped in case of wrong manipulation may be sufficient to release, or make possible, the operation which it is the purpose of the lock to fulfill. However, as a rule, it will be advantageous to command a considerably wider scope of motion and this can be achieved, as shown, by the groove 46, of the rotor continuing in concentrically extended groove portions 20. This permits the operating control of the lock to be turned almost a complete revolution of which one half applies to the selection and the second half to performing the lock's function.

As will be seen from the drawing, it is a required condition for the ball in each system to start its motion in the top groove of the system, the selection depending upon the ball following a downward course in conformity with the law of gravity. By turning back the rotor from any position whatever to the starting position all the balls will necessarily be led to the required exit position through the interaction of the inclined groove portion 6 in the rotor and the slightly more inclined groove portion 24 in the stator. In the systems located in the lower half the balls needs must remain in that position until brought into the top groove system and this is effected through a short branch groove 19 inclined in the opposite direction and issuing from the innermost end of the groove portion 6.

The reason one of the bodies is describe as transparent is only to facilitate the explanation. Actually, no essential part of the groove system should be visible from the outside at least not as long as the combination has not been solved.

Therefore, in order to facilitate operating, a key system has been worked out which, as shown in Figures 9 and 10 may consist, for instance, of a series of areas 18a–f on the rotor that are registered by a pointer or by a window for marking the angle areas within which the selection must be made.

Thus expressed, the key to the block combination illustrated in Figure 10 is 1-0-2-0-2-1, since in the first system the ball must be directed into the central groove, in the second system it must remain in the top groove, in the third system it must be brought down into the lowest groove, in the fourth system it must remain in the top groove, in the fifth system it must be brought down into the lowest groove, and in the sixth system it must be led into the central groove.

It is directly apparent from the drawing that changing of the key only means exchanging of the blocks 21 wherefore the main parts of the lock can be entirely uniform in execution. This permits taking advantage of a cheap and exact method of mass production, preferably by pressure casting, whereby the entire groove system issues complete and fully finished. Different combinations might be effected by exchangeable inserts in the casting mold.

Lock mechanisms according to the invention, in addition to being used in actual locks, can also be applied as indirect safeguards, for instance, as a means of blocking or opening access to operating handles or levers, to locks or other elements. It might, for example, effect the blocking of a key-hole to a key-lock.

Due to its compact and robust construction the locking mechanism can be produced in materials not particularly marked by qualities of strength, such as light metal alloys or plastic materials easily lending themselves to pressure casting and reinformed by conventional methods, viz. by reinforcement inserts of sheet metal, textile tissue or special wearing surfaces.

In the embodiments described the locking implements are described and shown as freely movable steel balls. There is nothing to prevent the use of some other material or some other shape, for instance, small cylinders so placed that their axes are parallel, or at right angles, to the border area of the interacting sliding bodies.

In the embodiments described here, three coordinated grooves in each system is the device used all along. The reason is that grouping a certain number of grooves in systems of threes offers the greatest number of possibilities for combinations. There is nothing to prevent, however, that the grooves be grouped in other ways, in groups with an identical or not identical number of grooves. It is also possible in a lock mechanism with only one groove system to use an arbitrary number of grooves, if so desired.

What I claim is:

1. A lock member comprising a first member and a second member associated with each other, each of said members having a surface, means securing said members in slidable relationship with said surfaces facing each other, a body independently movable positioned between said secured members, said first member having a groove therein defining a part of said surface thereof and movably receiving said body, said groove of said first member defining a plurality of adjacent channels and a partition between each of said adjacent channels, said partition having a passage therethrough, said passage interconnecting the adjacent channels transverse to said partition, the second member having a groove defining a part of said surface thereof and being transverse to said channels and receiving said body, said second member being movable with relation to said first member to shift the relationship of said groove in said second member with respect to said channels to move said body in said grooves, a channel blocking element in at least one of said adjacent channels and at least one channel being free of a blocking element whereby said body is movable in said channels by the relative movement between said first and second members, with said relative movement being restricted by said body to less than that required for unlocking when in said blocked channel and said relative movement being sufficient to cause unlocking when said body is in said unblocked channel.

2. A lock mechanism comprising a first curvilinear member and a second curvilinear member associated with each other, each of said members having a surface, means securing said members in a rotationally slidable relationship with said surfaces facing each other, a body independently movable position between said secured members, said first member having a curvilinear groove therein defining a part of said surface thereof and movably receiving said body, said groove of said first member defining a plurality of adjacent curvilinear channels and a curvilinear partition between each of said adjacent curvilinear channels, said partition having a passage therethrough, said passage interconnecting the adjacent channels transverse to said partition, the second member having a curvilinear groove defining a part of said surface thereof and being transverse to said channels and receiving said body, said first and second members being tiltable to move said body in said transverse passage and said groove of said second member transversely to said curvilinear channels, a channel blocking element in at least one of said adjacent curvilinear channels and at least one curvilinear channel being free of a blocking element whereby said body is movable in said channels by the relative rotational sliding movement between said first and second members, with said relative movement being restricted by said body to less than that required for unlocking when in said blocked channel and said relative movement being sufficient to cause unlocking when said body is in said unblocked channel.

3. A lock mechanism comprising a first member and a second member rotatably associated with each other, each of said members having a surface, means securing said members in a rotatable relationship with said surfaces facing each other, a body independently movable positioned between said secured members, said first member having a pair of curvilinear channels defining a part of said surface thereof and movably receiving said body, a curvilinear partition between said channels, said partition having a first passage transverse to said partition and intersecting the channels at the ends thereof and a second passage through said partition transverse to said partition and intersecting the channels intermediate the ends thereof, the second member having a groove defining a part of said surface thereof and being transverse to said curvilinear channels of said first member and receiving said body, said second member being movable relative to said first member to move said body in said passages and said channels, a channel blocking element in only one of said channels which restricts the relative movement by said body to less than that required for unlocking when in said blocked channel and said relative movement being sufficient to cause unlocking when said body is in said unblocked channel.

References Cited in the file of this patent

UNITED STATES PATENTS

| | | |
|---|---|---|
| 669,452 | Ashby et al. | Mar. 5, 1901 |
| 679,782 | Reenstierna | Aug. 6, 1901 |
| 805,687 | Vieweg | Nov. 28, 1905 |
| 2,078,002 | Keil et al. | Apr. 20, 1937 |
| 2,189,880 | Bugg | Feb. 13, 1940 |